United States Patent

Persinos

[15] 3,694,557
[45] Sept. 26, 1972

[54] ANTI-INFLAMMATION COMPOSITIONS CONTAINING TASPINE OR ACID SALTS THEREOF AND METHOD OF USE

[72] Inventor: Georgia J. Persinos, Rockville, Md.
[73] Assignee: The Amazon Natural Drug Company, Somerville, N.J.
[22] Filed: Oct. 23, 1970
[21] Appl. No.: 83,646

[52] U.S. Cl...............................424/279, 260/340.2
[51] Int. Cl. .............................................A61k 27/00
[58] Field of Search ....................424/279; 260/340.2

[56] References Cited

OTHER PUBLICATIONS

Sheinker, Chem. Abst., Vol. 53 (1959) page 22734f

Primary Examiner—Sam Rosen
Attorney—Francis D. Stephens and Hugo Huettig, Jr.

[57] ABSTRACT

A therapeutic composition and method for the treatment of various forms of inflammation and the like utilizing a therapeutically effective amount of taspine and derivatives thereof as the active ingredient of the composition.

8 Claims, No Drawings

ANTI-INFLAMMATION COMPOSITIONS CONTAINING TASPINE OR ACID SALTS THEREOF AND METHOD OF USE

BACKGROUND OF THE INVENTION

The present invention relates to therapeutically active compositions possessing anti-inflammatory activity and the method of use of such compositions in the treatment of various forms of inflammation. More specifically, the composition and method of the present invention employs taspine and derivatives thereof as the therapeutically active anti-inflammation agent of the composition.

Taspine, or thaspine, as it is sometimes identified, is an alkaloid having the empiral formula $C_{20}H_{19}NO_6$, and which possesses the following structural formula:

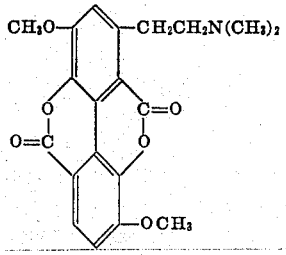

Taspine is an optically inactive compound that is light yellow in color and has a melting point of approximately 370° C. The compound is insoluble in water, alkali solutions, ammonia solutions, alcohol, or acetone, but is soluble in chloroform and dichloroethane. The compound was first obtained from the Leontika or snapdragon leaves (Leontice Ewersmanni Bge) belonging to the barberry family (Berberideaccae) which grow in Solviet Central Asia, in Iran, and in Afghanistam. The extraction of the material from such leaves and its properties was first made by T. F. Platanova et al and was reported in Zhur. Oschchei Khim. (Russian—Journal of General Chemistry) 23, 990 (1953). Furthermore, studies of the compound were made by T. F. Platanova et al. and were reported in Zhur. Obschchei Khim. (Russian—Journal of General Chemistry) 26 2651 (1956).

Various derivatives of taspine have been prepared and identified. Examples of such derivatives are inorganic acid salts, such as taspine sulfate, taspine hydrochloride, taspine picrate, and the like. Many of these derivatives and their physical properties were reported in the articles by T. F. Platanova et al. identified hereinbefore.

SUMMARY OF THE INVENTION

Taspine and the derivatives thereof have been found to be of particular utility as anti-inflammation agents when incorporated in therapeutic amounts with a pharmaceutical carrier. Taspine and its derivatives may be obtained in any desired manner from a suitable source such as hereinbefore identified. Taspine in the form of a base may be employed effectively as the active ingredient of the anti-inflammatory composition of the present invention, but it will be found more desirable to employ the compound in formulating the composition in the form of a salt of an inorganic or organic acid. The reason for this is that taspine is insoluble in a great many conventional vehicles, such as, for example, water, alcohol, alkaline solution, etc. However, the acid salts of taspine are partially soluble in such vehicles and therefore can be used more easily than the base. The acid salts of taspine may be inorganic acid salts, such as, for example, taspine hydrochloride or taspine sulfate, or the salts may be organic, such as, for example, taspine acetate or taspine picrate. A particular and preferred acid salt that may be used in the practice of the present invention is taspine hydrochloride since this compound is more easily prepared than the other acid salts.

Taspine and the acid salts thereof have been found to possess a high degree of anti-inflammatory activity. Such compounds will be found to be of value in the treatment of general anti-inflammatory diseases, and particularly edema problems, arthritic conditions, and those conditions generally responsive to anti-inflammatory drugs.

The compounds of the present invention may be incorporated in any suitable manner with an acceptable pharmaceutical carrier. In view of the insolubility of the taspine in water and alkaline solutions, the base compound, when used, has to be employed in powder form or in the form of a suspension in a suitable pharmaceutical carrier. The acid salts of taspine by reason of their partial solubility in water, alcohol, and the like, can be more readily combined with a pharmaceutical vehicle and are therefore preferred over the base. Taspine hydrochloride is the preferred acid salt to be employed in the present invention by reason of the fact that it is more easily prepared.

Compounds in accordance with the present invention may be administered orally in the form of a suspension, elixir, packaged powder, capsule, pill, tablet, lozenge and the like, or it may be used parentally by intramuscular injection. The pharmaceutical vehicle carriers to be employed with taspine or its acid salts to produce the desired pharmaceutical composition of the present invention may be any inert or excipient material normally employed as pharmaceutical composition components, such as, for example, binders, fillers, lubricants, stabilizers, preservants, retardants, buffers, colors, etc. Examples of such materials are cellulose derivatives, such as, for example, microcrystalline cellulose, carboxymethyl cellulose, etc.; starches, such as, for example, potato, maize, wheat, arrowroot, amylopectine, etc.; sugars, such as, for example, lactose, sucrose, saccharose, and other ingredients, such as, for example, gelatine, calcium phosphates, stearic acid powder, talc, mannitol, sorbitol, calcium stearate, magnesium stearate, polyethylene glycols, agar, gum acacia, etc.

The dosage of the anti-inflammation compound of the present invention in each case will depend in general on the type and severity of the condition being treated and the possible sensitivity of the patient to the compound. In general, dosages normally employed in preparing anti-inflammation compounds will be used in formulating pharmaceutical compositions in accordance with the present invention, such as, for example, on the order of 10 to 2000 mg. However, the exact individual dosage as well as daily dosage in a particular case will, of course, be determined according to established medical principles under the direction of a physician.

The preferred form of use of taspine and its salts is by way of a pill or tablet ranging in size from 200 to 600 mg., with the usual size of the tablet being on the order of 400 to 500 mg. In this form of use, taspine or the acid salt or other derivative will be combined in a conventional manner with the excipient or inert ingredients, such as the lubricants, binders, fillers and the like of the type hereinbefore indicated in any suitable and well known manner to form a free-flowing granulation of the carrier material and the anti-inflammation compound in proper dosage form. The granular mixture will thereafter be fed to a tablet forming machine where tablets containing individual dosage units of taspine or derivatives thereof are pressed or punched. In the administration orally of the taspine or its salts in unit dosage form by way of tablet, the compound may be present in 0.1 to 100 mg. per tablet, and preferably from 0.5 to 50 mg. per tablet. If desired, the tablet may be given a sugar or lacquer coating.

Taspine and its acid salts can be formulated also in capsule form and used in this manner as an anti-inflammation composition. The general procedure for this form of use is to combine the therapeutic agent with the excipient ingredients in a conventional manner to produce a complete mixture of the therapeutic agent and the carrier components. Such a mixture is thereafter placed in a conventional manner in individual capsule units to produce an individual dosage. The unit dosage for use of the composition in capsule form may correspond in general with the unit dosage employed in the tablet form but may be of a lesser mg. weight in many instances.

In parental use, taspine or its acid salts may be suspended or partially dissolved in a conventional saline solution or like carrier and injected in proper dosage form. In general, the dosage will be about 0.2 to 5 percent by wt. in an aqueous suspension, and such suspension, if desired, may contain buffers or stabilizing agents. Such parental use will, in general, be by intramuscular injection.

DESCRIPTION OF SPECIFIC AND ILLUSTRATIVE EMBODIMENTS.

In obtaining the taspine and its derivatives to be employed in the practice of the present invention, such material was obtained by the processing of sap obtained from the trees of Croton lechleri M. Org. (Euphorbiaceae) found growing in the upper Amazon basin of Peru. In this extraction process, the trees are first slashed and a red, viscous exudate in the form of a sap is recovered therefrom. The sap is thereafter subjected to an extraction process to produce the desired taspine.

The specific mode of isolating taspine and the production of the acid salt is illustrated in the following example:

EXAMPLE A 1000 ml. of the red, viscous exudate (sap) obtained by slashing the trees of Croton lechleri M. Org. (Euphorbiaceae) found growing along the upper Amazon Basin of Peru was made alkaline with 10 ml. of 28 percent ammonium hydroxide, and extracted with 750 ml. of chloroform. The chloroform layer was removed, and reduced in vacuo to cas 50 ml. on a rotary evaporator at 40° C. This reduced volume was then air-dried and the yellow residue was scraped and collected. The chloroform extractions were continued until no more residue was obtained. The residue was recrystallized from ethylene dioxide. The recrystallized material was then vacuum dried and found to have a melting point of 370° C. This compound was taspine.

One mg. of the recrystallized material was dissolved in 1 ml. of chloroform and 30 lambda were spotted on a thin-layer chromatogram of alumina oxide G. The chromatogram was developed in n-butanol/glacial acetic acid/water (4:1:1). After development, the chromatogram was air-dried, and when viewed under ultraviolet light, there were no fluorescent spots. The chromatogram was sprayed with Dragendorff's reagent, and a red-orange color was obtained at Rf. 0.77, which is indicative of a positive test for alkaloids.

The analytical analyses showed the formula of the compound to be $C_{20}H_{19}NO_6$. This structure was supported with the mass spectral data which showed a molecular weight of 369. The NMR spectrum showed 19 protons and all other peaks supported the above formula. The infra-red spectrum indicated a main peak at the carbonyl - an $\alpha$-$\beta$ unsaturated lactone.

Five grams of the recrystallized base were dissolved in ethylene dichloride and to it as bubbled HCl. The precipitate which formed was filtered through a Büchner funnel and recrystallized from water/95 percent ethanol. The compound was taspine hydrochloride.

To produce any of the other acid salts, the recrystallized material produced in the manner described in EXAMPLE A may be reacted with a desired inorganic or organic acid to produce the desired taspine salt or addition compound, such as, for example, taspine sulfate, taspine picrate, taspine acetate, etc. As has been hereinbefore indicated, taspine can be employed in the form of its base if so desired. Under such circumstances, the recrystallized material produced in EXAMPLE A prior to forming the acid salt may be employed in the form produced therein by incorporating same with a pharmaceutical carrier.

In order to further illustrate the present invention, the following examples of compositions made in accordance with the present invention are given:

EXAMPLE 1

|  | Mg/tablet |
| --- | --- |
| Calcium phosphate | 160 |
| Lactose powder | 365 |
| Magnesium stearate | 5 |
| Taspine hydrochloride | 30 |
| Total: | 480 mg. |

The above ingredients are granulated and mixed with one another in a conventional and known pharmaceutical technique to produce a free-flowing granulation of the component parts. The granulated mixture is then compressed in a conventional tablet forming machine into 480 mg. tablets.

EXAMPLE 2

|  | Mg/capsule |
| --- | --- |
| Microcrystalline cellulose[1] | 200 |
| Lactose powder | 100 |
| Carboxymethyl cellulose | 20 |
| Taspine hydrochloride | 80 |
| Total: | 400 mg. |

[1] Marketed under the trademark "Avicel" by American Viscose Corp., Marcus Hook, Pa.

The above named ingredients are blended with one another in a known pharmaceutical technique to produce a thorough mixture of the ingredients. Thereafter the mixture is placed in a No. 2 hard gelatin capsule and is ready for use in this manner.

EXAMPLE 3

| | Mg/tablet |
|---|---|
| Calcium phosphate | 90 |
| Sucrose powder | 250 |
| Calcium stearate | 5 |
| Taspine sulfate | 25 |
| Total: | 370 mg. |

The composition is prepared in a conventional pharmaceutical technique as herebefore described and used in tablet form.

EXAMPLE 4

| | Mg/capsule |
|---|---|
| Lactose powder | 125 |
| Carboxymethyl cellulose | 30 |
| Microcrystalline cellulose | 150 |
| Taspine sulfate | 20 |
| Total: | 325 mg. |

The composition is prepared in a conventional pharmaceutical technique and used in capsule form.

EXAMPLE 5

| | Mg/tablet |
|---|---|
| Cornstarch | 60 |
| Lactose powder | 60 |
| Taspine | 40 |
| | 140 mg. |

This composition is prepared in a conventional pharmaceutical technique and used in tablet form.

EXAMPLE 6

| | Gram |
|---|---|
| Taspine hydrochloride | 2.5 |
| Sodium chloride | 0.5 |
| Pyrogen free distilled water | q.s. 100 ml. |

Taspine hydrochloride is dissolved to the extent possible under aseptic conditions in the pyrogen free distilled water. The sodium chloride was then added to render the solution substantially isotonic. The solution so formed is then filled into ampules having a normal 2 ml. capacity in an amount of 2.2 ml. per ampule. The ampule is thereafter sealed and sterilized by heating it in an autoclave at about 115° C for 30 minutes. The ampule is ready for intramuscular injection.

To illustrate the anti-inflammatory activity of taspine, the hydrochloride salt thereof as prepared in EXAMPLE A described hereinbefore was employed in three different test evaluations. These tests are as follows:

EXAMPLE I

Carrageenin Assay[1]

([1] Winter, C. A., Risley, E. A., and G. W. Nuss. 1962 Carrageenin-induced edema in hind paw of the rat as an assay for anti-inflammatory drugs. Proc. Soc. Exp. Biol. Med. 111:544–47)

Young, adult, male Wistar rats of 175 gram body weight were separately caged and allowed food and water (Rockland Mouse and Rat Diet) ad libitum during the eight hours. Groups of eight animals were used for each of the test drug, standard (phenylbutazone) and controls.

One hour prior to the administration of the phlogistic agent - carrageenin, an extract of Chondrus obtained from Algin Corp. of America, the drug was administered orally at a dose of 100 mg/Kg. Controls received only the agar suspension. Phenylbutazone was given orally as the standard (Geigy & Co.) at a dose of 200 mg/Kg.

0.1 ml suspension of carrageenin (prepared as a 1 percent suspension in 0.9 percent NaCl) was injected into the plantar aponeurosis of the right hind paw. Zero hour measurements of right hind paw volume were taken immediately following this injection and recorded on standardized work sheets; +3 hour and +4 four post-carrageenin injection measurements were similarly recorded. All volume measurements were taken using modified plethysmographic apparatus which permitted operation by a single investigator.

The data was evaluated by determining the milliliter increase in paw size from zero hour measurements at +3 and +4 hours for each rat. Using these values the test agents were statistically tested for significant activity relative to agar controls ($t$ and $F$ tests; $P.O.05$).

The results of this test are reported in the following table:

TABLE I

| Drug | Oral mg./kg. dosage | Date | N | t value 3 hr. | t value 5 hr. | tabled t | F value 3 hr. | F value 5 hr. | tabled F | P:0.05 Sig. 3 hr. | P:0.05 Diff. 5 |
|---|---|---|---|---|---|---|---|---|---|---|---|
| Phenylbutazone | 200 | 10/13/69 | 8 | 8.558 | 1.772 | 4.60 | 2.185 | 1.866 | 4.99 | Yes | No. |
| Taspine hydrochloride | 100 | 10/13/69 | 8 | 8.172 | 10.192 | 4.60 | 1.111 | 1.363 | 4.99 | Yes | Yes. |
| Phenylbutazone | 200 | 10/21/69 | 8 | 25.657 | 8.048 | 4.60 | 1.054 | 5.833 | 4.99 | Yes | Yes. |
| Taspine hydrochloride | 100 | 10/21/69 | 8 | 19.100 | 7.583 | 4.60 | 2.052 | 1.000 | 4.99 | Yes | Yes. |

From Table I above it can be seen that taspine hydrochloride at a dose of 100 mg/Kg inhibited the edema similarly to phenylbutazone at a dose of 200 mg/Kg.

EXAMPLE II

Mycobacterium butyricum[1]

([1] Ward, J. N., and Cloud, R. S. 1966. Comparative effect of anti-rheumatic drugs on adjuvant-induced polyarthritic in rats. J. Pharmacol. and Exp. Therapeutics 152:116–121.)

Young, adult, male Fischer rats weighing 175 grams were housed separately in wire bottom cages and allowed food and water ad libitum (Rockland Mouse & Rat Diet).

Daily oral administration of an aqueous suspension of taspine hydrochloride, and an agar suspension of indocin (Merck, Shape and Dome) as the standard as well as agar suspension for the control was initiated on dage - 2 and continued through day 18 of the experiment. A 0.1 suspension of Mycobacterium butyricum (5.0 mg/ml of light petrolatum) was injected into the plantar aponeurosis of the right hind paw. Volume measurements of the right hind paw were taken immediately following this injection and recorded on standardized work sheets. Similar volume measurements were taken on days 3, 6, 9, 12, 15 and 18. The plethysmographic apparatus used was the same as described in the Carrageenin test.

In evaluating the results, the milliliter changes for both paw volumes for days 3, 6 . . . 18 were calculated from the zero day paw volume determination for each animal. The mean milliliter increases in paw volume versus days were plotted on arithmetical axes for each test group.

The results of the test are shown in the following graph:

each of the test drug, standard (indocin) and controls. To cotton pellets made by cutting 5 mm sections from cotton dental rolls (Johnson & Johnson No. 1) was added an aqueous solution of ampicillin. The pellets were then dried and weighed. Two pellets were subcutaneously implanted on each side of the abdomen.

Oral administration of taspine hydrochloride (20 mg/Kg) and indocin (1 mg/Kg) was carried out for seven days. The control animals received agar (0.25 percent) orally also for seven days.

After 7 days the pellets together with the granuloma were removed and the dry weight obtained.

The results of the test are shown in the following table:

TABLE III

| Mean Weight of Pellet (Gm.) | | % Inhibition |
|---|---|---|
| Agar | 0.1608 | |
| HCl | 0.1366 | 15.04 |
| Indocin | 0.1320 | 17.91 |

As can be seen from the above table, taspine hydrochloride and indocin inhibited granuloma formation.

TABLE II

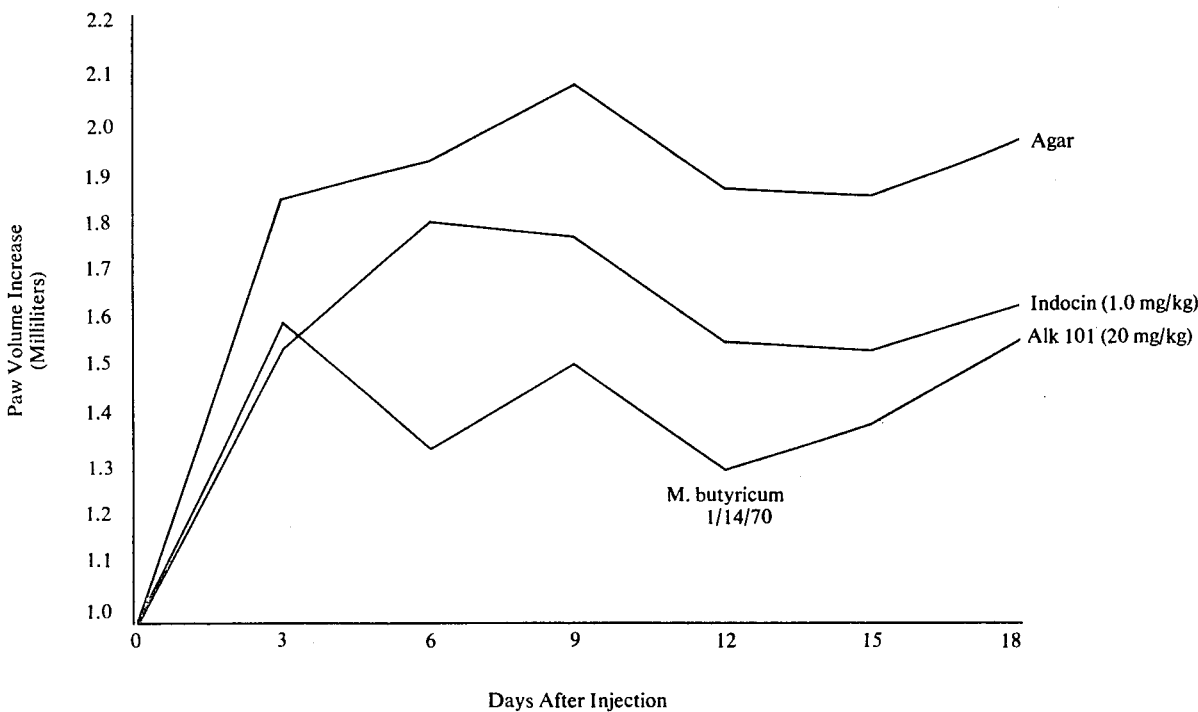

Days After Injection

Results

From the above graph it can be seen that taspine hydrochloride significantly inhibited paw edema.

EXAMPLE III

Cotton Pellet Granuloma[1]

([1] Winter, C. A., Risley, E. A., and G. W. Nuss. 1963. Anti-inflammatory and antipyretic activities of indomethacin, 1-(p-chlorobenzoyl)-5-methoxy)-2-methyl-indole-3-acetic acid.)

Young, adult, male Wistar rats of 200 gram body weight were separately caged and allowed food and water (Rockland Mouse & Rat Diet) ad libitum during the entire study. Groups of eight animals were used for

I claim:

1. A pharmaceutical composition in dosage unit form for producing anti-inflammation activity comprising a dosage unit form containing an effective but non-toxic quantity of an anti-inflammation compound selected from the group consisting of taspine and acid salts of taspine, and a pharmaceutically acceptable carrier.

2. A pharmaceutical composition in accordance with claim 1, wherein the anti-inflammation compound is taspine.

3. A pharmaceutical composition in accordance with claim 1, wherein the anti-inflammation compound is an acid salt.

4. A pharmaceutical composition in accordance with claim 1, wherein the anti-inflammation compound is an inorganic acid salt of taspine.

5. A pharmaceutical composition in accordance with claim 1, wherein the anti-inflammation compound is an organic acid salt of taspine.

6. A pharmaceutical composition in accordance with claim 1, wherein the anti-inflammation compound is taspine hydrochloride.

7. A method of treating inflammation which comprises the administration to patients of 10–2000 mg. of an anti-inflammation agent selected from the group consisting of taspine and acid salts thereof.

8. A method in accordance with claim 7, wherein the administration is in tablet form.

* * * * *